United States Patent [19]
Chapman et al.

[11] Patent Number: 5,845,204
[45] Date of Patent: Dec. 1, 1998

[54] METHOD AND APPARATUS FOR CONTROLLING THE WAKEUP LOGIC OF A RADIO RECEIVER IN SLEEP MODE

[75] Inventors: Mark Chapman, Irvine; Dennis E. Starbuck, Fountain Valley, both of Calif.

[73] Assignee: Rockwell International Corporation, Newport Beach, Calif.

[21] Appl. No.: 514,509

[22] Filed: Aug. 11, 1995

[51] Int. Cl.$^6$ .................................................. H04B 1/16
[52] U.S. Cl. ........................ 455/343; 455/38.3; 370/311
[58] Field of Search ........................ 455/89, 38.3, 316, 455/317, 343, 574; 340/825.44; 370/311

[56] References Cited

U.S. PATENT DOCUMENTS

| 5,058,203 | 10/1991 | Inagami | 455/343 |
| 5,142,699 | 8/1992 | Sato et al. | 455/343 |
| 5,280,650 | 1/1994 | Sobti | 455/343 |
| 5,283,568 | 2/1994 | Asai | 455/38.3 |
| 5,428,820 | 6/1995 | Okada et al. | 455/343 |
| 5,448,755 | 9/1995 | Tanaka | 455/38.3 |

*Primary Examiner*—Edward F. Urban
*Attorney, Agent, or Firm*—William C. Cray; Philip K. Yu

[57] ABSTRACT

A low-power stop mode "snooze" timer is implemented in the processing unit of a communication system, which runs without the use of the usual crystal-controlled oscillator. The "snooze" timer is implemented by a second oscillator with associated timer circuit. The second oscillator runs continually and feeds a timer which is loaded with a suitable value. The timer, when timed out or expired, will reactivate the main processing functions, thus allowing the successful reception of an external signal from a remote transmission source. To compensate for the inaccuracy of the second oscillator due to its dependence upon voltage, process and temperature, the snooze timer's output is calibrated during the wake-up periods against a timing signal derived from the internal crystal-controlled timing source. This calibration compensates for the inherent frequency instability of the second oscillator and allows a timing signal of sufficient accuracy to be maintained over the stop cycle.

11 Claims, 5 Drawing Sheets

METHOD AND APPARATUS FOR CONTROLLING THE WAKEUP LOGIC OF A RADIO RECEIVER IN SLEEP MODE

FIELD OF THE INVENTION

The present invention relates to electronic systems which operate between a normal operating mode and a power-saving "stop" mode during prolonged period of inactivity and can self-awaken periodically. Example of such electronic systems are communication devices such as packet radios and wireless telephone systems with low-power stop mode for power conservation purposes.

ART BACKGROUND

In the development of wireless wide area communications systems such as Mobitex™, CDPD packet radio and advanced wireless voice/data communications systems, there has been a need to provide as low a power sleep state as is possible to achieve longer battery life. This is particularly important in emergent two-way data communication radio networks, where one of the prime intended uses for these systems is as wireless wide area extension of network services such as electronic mail. For systems such as Personal Communications System ("PCS") phones, there are also additional requirements that the systems be light and compact while providing maximum talk time. This translates into minimum component count and advanced shut-down features. Further, if asynchronous page signaling is incorporated in the system as in packet radio, then the system will have to self-awaken in a given period in order not to miss the page signal.

To achieve maximum benefit from the network, it is highly desirable to allow "connectionless contact," where a mobile user is effectively continually connected to the network and messages can be sent to the mobile user without any prior need to "switch on" the equipment or to have the mobile receiver continually active in receive mode. This has been achieved in the system by allowing the mobile user to register with the network and then to go into a sleep, or stop, mode. The user is transparently transferred or "roamed" between cell sites until such time as a transmission is requested or there is an incoming message or connection request for the terminal.

To allow the maximum battery lifetime in the subscriber unit, the mobile unit periodically shuts down completely for a predetermined time as agreed between the unit and the controlling basestation and then wakes up at the appropriate moment. The basestation issues a list of "connection requests", pages, at this instant and if the mobile unit's address is active in the list, it will remain powered up in receive mode. If there is no activation request, or page, in the broadcast list, it will re-enter the sleep mode until the next wake-up period.

Such a system allows the mobile unit to perform a highly efficient "sleep/receive" duty cycle, which greatly reduces the power consumed while allowing a fully transparent connection capability. As far as the user is concerned, she is connected to the network and all the services are available to her. Incoming messages and connection requests will appear just as if there were truly a continuous connection in place.

Such a method of communication allows "forced delivery mode" for messages which will become highly desirable in so-called Personal Digital Assistants ("PDA"), where battery power is at a premium and yet its very existence depends on its ability to allow two-way messaging.

In such a method of communication as above, it is likely that the communication link will be provided by use of a packet radio modem, which will contain a modulator/demodulator, a microprocessor-based protocol engine, possibly with either a radio transceiver or a link to a suitably equipped cellphone. Upper layers of connection protocol may reside on a host computer system and will generally only become active when an actual message is being transmitted or received. This architecture allows the modem device to handle the communications link and maintain the "connection" in sleep mode without requiring activation of the upper layers of protocol and hence the host system.

A problem with this feature is that the timing associated with this system sleep facility requires a fair degree of accuracy to ensure that the remote unit and the basestation remain in synchronism. That is, there is no asynchronous "ring" event occurring which will force the system to wake up. This requires that some timing component be continually active in the remote unit and this timing component needs to be fairly accurate.

The usual method of achieving this timing function would be to run the timer in the microprocessor or microcontroller, while shutting down all other possible power drains, such as the receiver front end, etc. However, this usually involves either the use of a crystal oscillator circuit or some autonomous wake-up function from an external timing element.

The crystal oscillator circuit in a microprocessor, or microcontroller, is a considerable power drain on the overall system in sleep mode and running this circuit and its associate internal timer results in significant power consumption in sleep mode. As sleep mode time is very large in the "sleep/receive" duty cycle, this clearly results in a significant reduction in potential battery lifetime. While the use of a low-power external timing device could alleviate this problem, it would result in additional circuitry with associated cost and real estate penalties.

SUMMARY OF THE INVENTION

Therefore, it is an object of the present invention to be able to use as little power as possible in stop mode while maintaining system contact.

It is also an object of the present invention to achieve high integration by including suitable low-power timing circuitry in the microprocessor/microcontroller itself.

It is further an object of the present invention to be able to allow accurate timing even during stop mode without the use of external timing components or the internal crystal oscillator.

It is yet another object of the present invention to be able to allow a low-power, accurate timing source by continual calibration from a known timing source.

To resolve the above problem, a "snooze" timer is included in the processing unit of an electronic system, which runs without the use of the usual crystal-controlled oscillator. The "snooze" timer is implemented by a ring oscillator, or other low-power clocking mechanism, with associated timer circuit. The ring oscillator runs continually and feeds a timer which is pre-loaded with a suitable value. The timer, when timed out or expired, will reactivate the main processing functions, thus allowing the successful reception of an external system synchronization signal from a transmission source.

To compensate for the inaccuracy of the ring oscillator due to its dependence upon voltage, process and temperature, the snooze timer's output is calibrated during the wake-up periods using a timing signal derived from the internal crystal-controlled timing source. This calibration compensates for the inherent frequency instability of the ring oscillator and allows a timing signal of sufficient accuracy to be maintained over the stop cycle.

The low-power stop mode timer of the present invention thus allows a very low-power, accurate timing signal to be maintained without the use of external timing components during the critical stop periods, where power consumption should be at an absolute minimum.

BRIEF DESCRIPTION OF THE DRAWINGS

Additional objects, features and advantages of the present invention will become apparent to those skilled in the art from the following description, wherein.

DETAILED DESCRIPTION OF THE DRAWINGS

An apparatus and method of providing low-power stop mode in a processor-based electronic system such as a packet radio communication system is disclosed. In the following description, the present invention is described in terms of algorithms and functional block diagrams, which are the usual means for those skilled in the art to communicate with others similarly skilled in the art. It should be appreciated by those skilled in the art that the present invention is not strictly limited to its symbolic representation herein and those skilled in the art can easily modify to implement the present invention for their particular applications.

Also, although the following description discloses the present invention in the context of a processor-based communication device, it should be appreciated by those skilled in the art that the present invention may be readily adapted for use in connection with other electronic devices where a self-awakening function from a low-power inactive mode is desired.

Figure 1A:
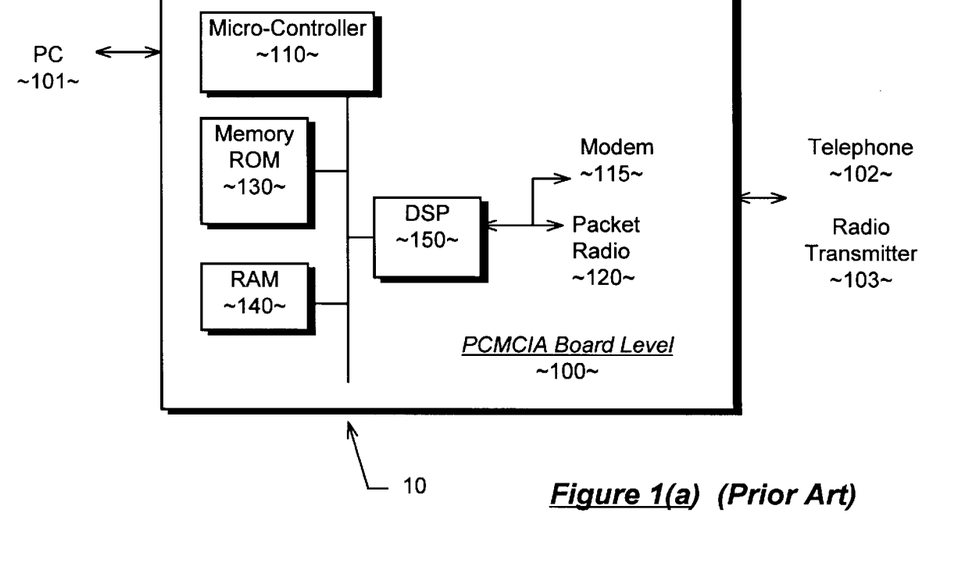
FIG. 1(a) shows a conventional microprocessor-based communication system in a simplified block diagram.

Reference is to FIG. 1(a), where a conventional processor-based packet radio communication system is shown in a simplified block diagram. The communication system 10 may be implemented in a format commonly known as PCMCIA card 100, interfacing between a portable computer 101 and telephone 102 or radio transmitter 103. In the case of a packet radio, this PCMCIA card 100 will allow a mobile user to receive her e-mail on her portable computer 101 through a telephone connection 102 or a wireless radio connection 103.

Typically the PCMCIA card 100 may comprise a microcontroller 110 for facilitating data transfer by a communication device such as an on-board analog receiver/transmitter such as a modem 115. The microcontroller 110 most likely will also have ROM 130 and RAM 140 memories, as well as a digital signal processor 150, to achieve its desired functionality.

Figure 1B:
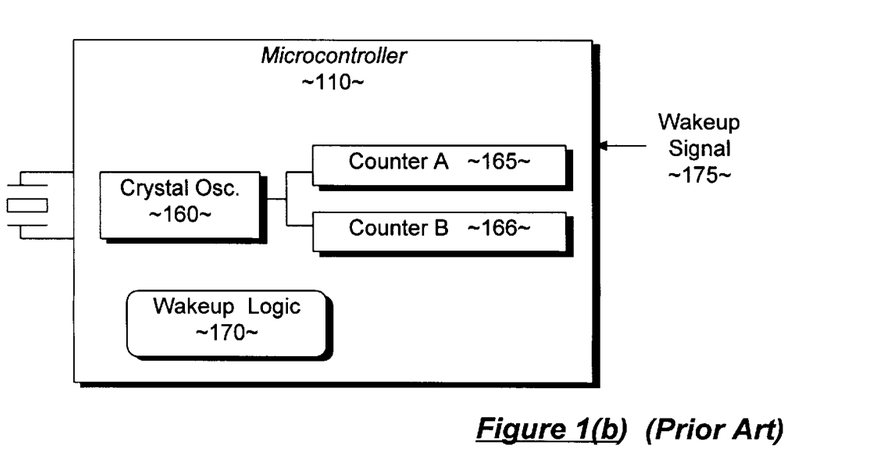
FIG. 1(b) shows a crystal oscillator with wakeup logic implemented with the conventional microprocessor-based communication system.

Reference is to FIG. 1(b), where a crystal oscillator 160 with wakeup logic 170 are illustrated with the conventional microcontroller 110. As described above, an external wakeup signal 175 will be needed in a conventional system to wake up the system. If the microcontroller 110 is interfacing with a telephone line 102 through a modem 115, then the ring signal from the telephone will serve as an external wakeup signal 175, triggering the wakeup logic 170. Therefore, the microcontroller 110 can run both "stop" and "sleep" modes, in addition to its normal operating mode, since the external wakeup signal 175 can also be used to provide the needed synchronization for the crystal oscillator 160.

It should be noted that in "sleep" mode, the crystal oscillator 160 may be running, although at a low-power state, while the rest of the circuitry is shutdown, until the wakeup signal 175, i.e. telephone ring signal, is received. In "stop" mode, the crystal oscillator 160 is also shut down, resulting in extremely low power, thus further extending the battery's life.

However, in the case of the microcontroller 110 in a processor-based communication system, such as a packet radio system, there is no external wakeup signal 175 available for the crystal oscillator 160. The data stream is to be received by the system, which must be either awake, or in normal operating mode, at that time. Therefore, the crystal oscillator 160 needs to be continuously running in a powered-up state, drawing constant power and shortening the battery's life. As previously described, this constant power usage has become quite a disadvantage for the packet radio system.

Figure 2:
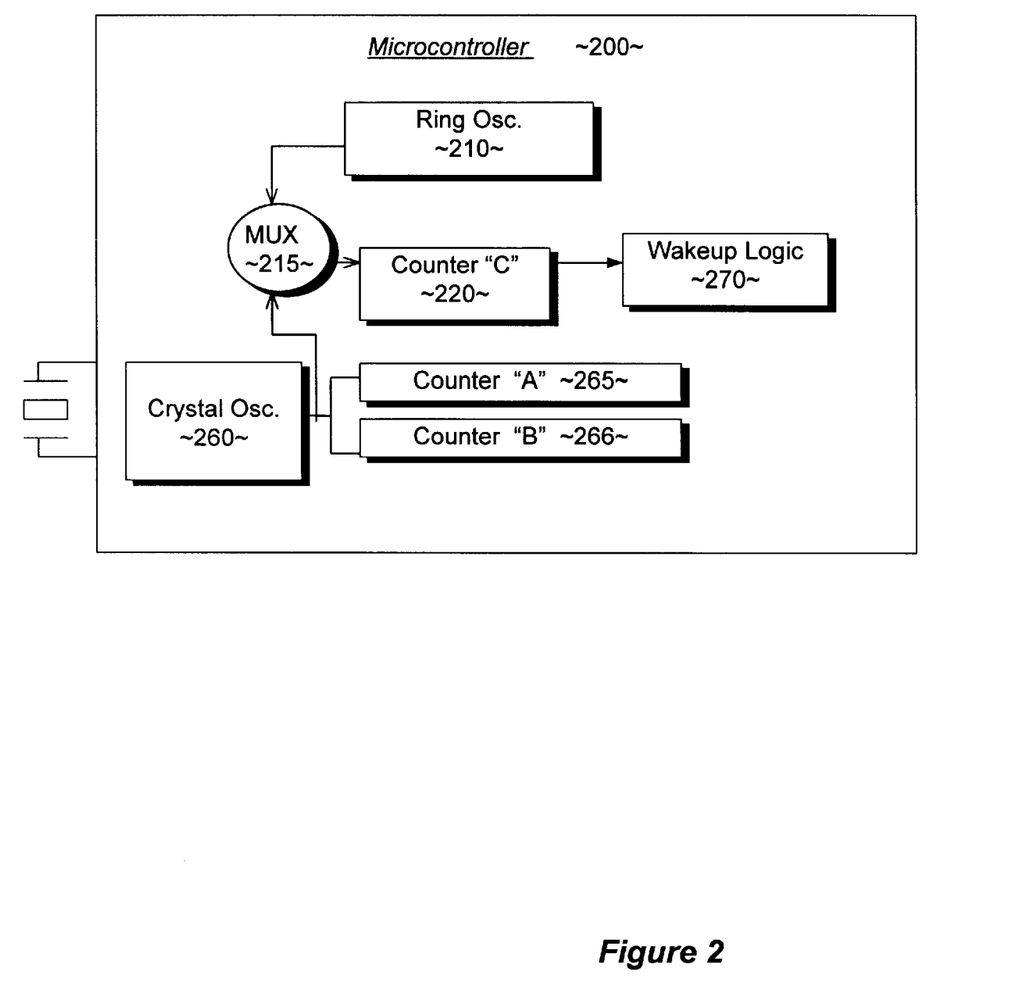
FIG. 2 illustrates a simplified system diagram of a microcontroller incorporating the low-power apparatus of the present invention.

Reference is to FIG. 2, where a simplified system diagram of a microcontroller 200 incorporating the low-power self-awakening apparatus of the present invention is illustrated. The counting signal from a ring oscillator 210, typically running between 50 KHz and 200 KHz, is directed to a counter 220 through a multiplexer 215, allowing the crystal oscillator 260 to completely shut down in stop mode. The ring oscillator 210 and the counter 220, with the characteristics of drawing very little power in both sleep and stop modes, allow the microcontroller 200 to self-awake based on a pre-set time period. When the system containing the microcontroller 200 falls into sleep or stop mode, the ring oscillator 210 and the counter 220 continue to operate. With the multiplexer 215 selected to direct the counting signal from the ring oscillator 210 to the counter 220 during sleep or stop mode, the counter 220 can activate the wakeup logic 270 of the microcontroller 200 after it expires. When the microcontroller 200 is in normal operating mode, the crystal oscillator can resume its timing functions for the entire system. If the multiplexer 215 selects the crystal oscillator 216 as the counting signal, a more highly accurate time reference is possible.

Figure 3:
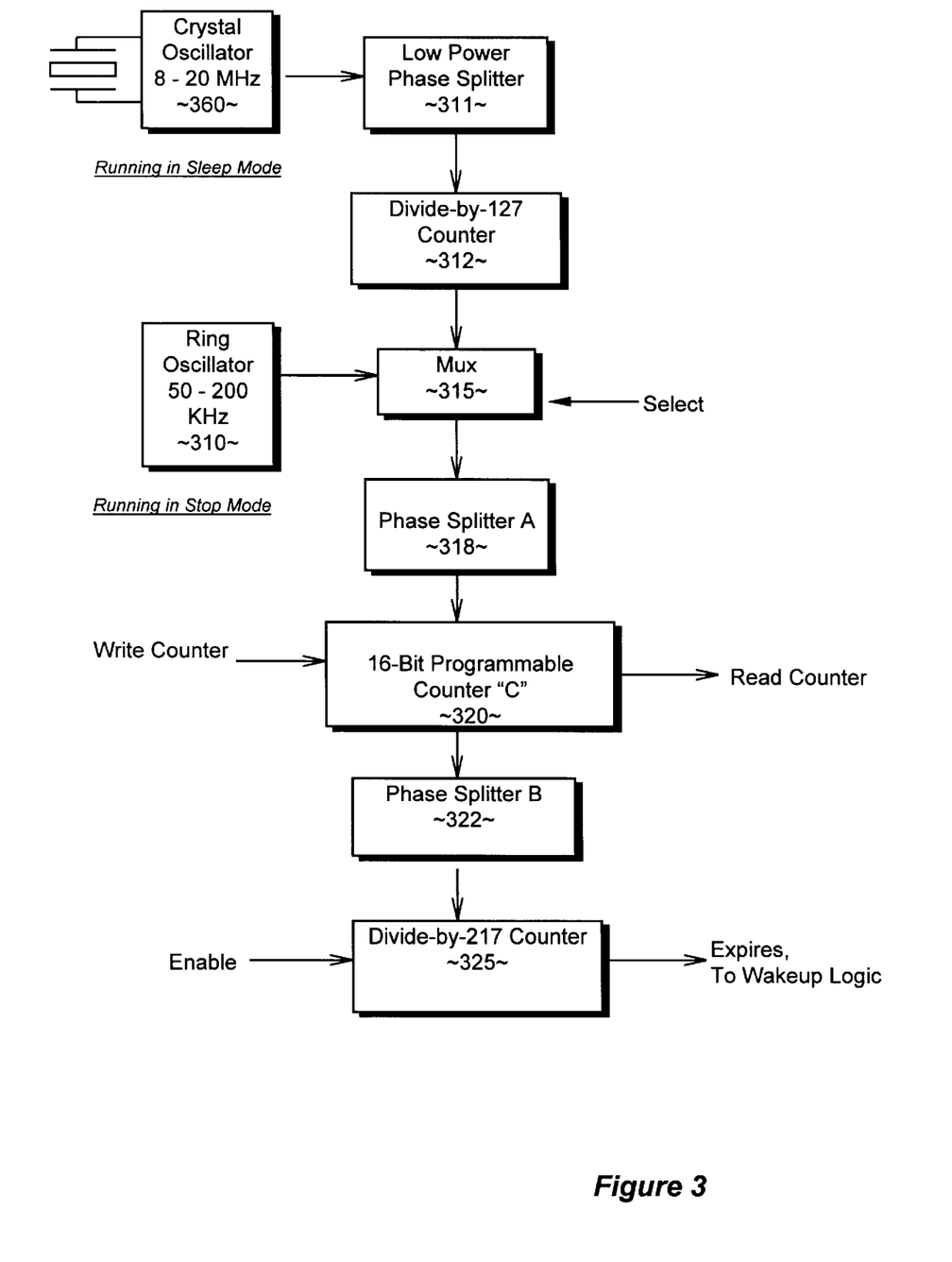
FIG. 3 illustrates a simplified functional block diagram of the lowpower apparatus of the present invention.

Reference is to FIG. 3, where a functional block diagram illustrating the low-power apparatus of the present invention is shown. The ring oscillator 310 is coupled to a multiplexer 315, which also has an input from the crystal oscillator 360, through a low-power phase splitter 311 and a divide-by-127 counter 312. The output from the multiplexer 315 is applied to a phase splitter "A" 318, through a 16-bit programmable counter 320 and similarly the counter 320 underflows through a phase splitter "B" 322 and eventually to a divide-by-217 counter 325.

Note that the divide-by-127 counter 312 and the divide-by-217 counter 325 are implemented in the presently preferred embodiment to extend the time period for the crystal oscillator 360 and ring oscillator 310 and those skilled in the art can easily modify this embodiment to suit their particular applications and needs. Also, the phase splitters "A" and "B", 318, 322, are presently implemented for specifying the phases of the signals, i.e. rising edges or falling edges, to be counted by the counters 320, 325.

After the system is awakened, or in normal operating mode, the crystal oscillator 360 can provide accurate timing signals for the entire system. In stop mode, the ring oscillator 310 provides the counting signal to the counter 320, through the multiplexer 315, drawing very little power. When the divide-by-217 counter 325 expires, the wakeup logic is activated.

While the ring oscillator 310 and counter "C" 320 activate the wakeup logic of the microcontroller, they are generally not as accurate as the crystal oscillator 360, especially when the accuracy of the ring oscillator 310 is generally process-, temperature- and voltage-dependent, as those skilled in the art would readily appreciate. Without some calibration mechanism, it is likely that the ring oscillator will generate inconsistent stop/awake duty cycles, thus unnecessarily drawing power from the battery.

Figure 4:
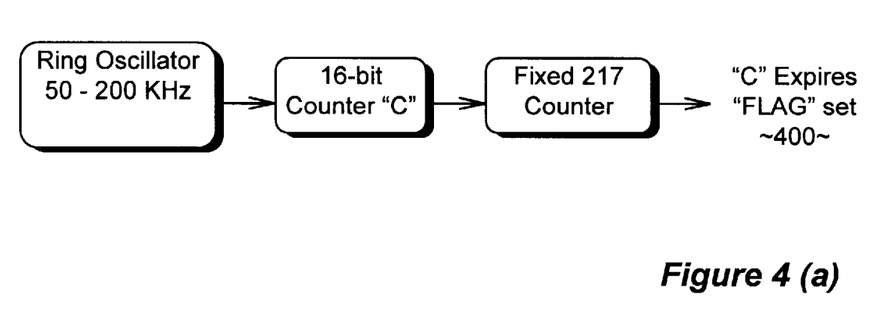
FIGS. 4(a), 4(b) and 4(c) illustrate the calibration process flow.

Reference is to FIGS. 4(a), 4(b) and 4(c), where the calibration process for the ring oscillator 310 in accordance with the present invention is illustrated. FIG. 4(a) shows that the ring oscillator 310, which can run in operating, sleep or stop modes, provides the signals for the 16-bit counter to count. The fixed 217 counter acts to extend the period before the wakeup logic is triggered. When the 16-bit counter expires, a first flag is set (400). The use of the first flag will be further described in the description of FIG. 4(c).

FIG. 4(b) shows that the crystal oscillator, during operating mode, provides signals for its own 16-bit counter to count and when the counter expires, a second flag is set (410). The use of the second flag will be further described in the description of FIG. 4(c).

FIG. 4(c) now describes how the ring oscillator is calibrated by comparing its counter "C" with the counter "A", which is based on the much more accurate and stable crystal oscillator. Referring to FIG. 4(c), calibration is started after the system becomes awake (420). After both counters "A" and "C" are set to a respective known value (421, 422), the counters are enabled, or caused to count (423). Since the counter "A" receives its counting signal from a much faster crystal oscillator typically running between 8–20 MHz, the counter "A" will expire more often than the counter "C", which counts the slower ring oscillator (between 50 KHz–200 KHz). Every time the counter "A" expires, while the counter "C" has not, a software counter is incremented (425).

When the counter "C" finally expires, the value in the counter "A" is read (426), as well as how often it has expired from the software counter (427). This determines how many actual counts the counter "A" has experienced through the crystal oscillator. The actual time according to the counter "A" can thus be calculated, by using the frequency of the crystal oscillator and the counter "A"'s total count (428). The ratio of the actual time based on the counter "A" to the pre-set known value of counter "C" determines the actual period of the ring oscillator (429). With this information, the more accurate value to pre-set the counter "C" for stop mode can be calculated (430).

Note that this calibration process may be invoked when the device has just awakened, when it is powered on, or whenever the accuracy of the ring oscillator is likely to have degraded due to any reason, e.g. change of temperature. It should be noted, however, that those skilled in the art can easily determine their calibration requirements based on their applications.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. A device for invoking a wakeup logic of a processing unit in an electronic system from a low-power stop mode after a predetermined time period, said electronic system comprising a first oscillator of a predetermined frequency and a first counter for providing internal timing to said electronic system, said electronic system converting itself into said low-power stop mode after a predetermined period of inactivity, said low-power stop mode causing said electronic system to remain non-operational until said stop mode is terminated, comprising:

a second oscillator of a nominal predetermined frequency for continuously generating an oscillating signal in said low-power stop mode, said second oscillator being less accurate than said first oscillator, said second oscillator being integrated within said processing unit;

a second counter coupled to said second oscillator for counting said oscillating signal to a predetermined count until said second counter expires in said predetermined time period;

detection means coupled to said second counter for detecting if said second counter has expired and if so, said detection means generating a wakeup signal to invoke said wakeup logic, such that said stop mode is terminated after said predetermined time period, further comprising:

a calibration means coupled to said second oscillator and to said first oscillator, said calibration means, operative after said stop mode is terminated, causing said first counter to count using said first oscillator, after said first oscillator is out of said stop mode, with said second counter also counting, from a predetermined initial count until said second counter expires, using said second oscillator, said calibration means determining an operating frequency of said second oscillator, based on the time it takes said second counter to expire measured by said first counter and said predetermined initial count, and setting said predetermined time period according to said operating frequency of said second oscillator.

2. A device according to claim 1, wherein said calibration means:

synchronizing said second counter with said first counter in a normal operating mode;

said first counter continuously counting said first oscillator until said second counter has expired;

reading said first counter to determine the time it took said second counter to expire;

calculating said operating frequency of said second oscillator based on said time it took said second counter to expire and said predetermined count initially set in said second counter.

3. A device for invoking a wakeup logic of a processing device in a packet radio communication system from a low-power stop mode after a predetermined time period, said packet radio communication system comprising a first oscillator of a predetermined frequency and a first counter for providing internal timing to said communication system, said packet radio communication system converting itself into said low-power stop mode after a predetermined period of inactivity, said low-power stop mode causing said packet radio communication system to remain non-operational until said stop mode is terminated, comprising:

a second oscillator of a nominal predetermined frequency for continuously generating an oscillating signal in said low-power stop mode;

a second counter coupled to said second oscillator for counting said oscillating signal to a predetermined count until said second counter expires in said predetermined time period;

detection means coupled to said second counter for detecting if said second counter has expired and if so, said detection means generating a wakeup signal to invoke said wakeup logic, such that said stop mode is terminated after said predetermined time period, further comprising:

a calibration means coupled to said second oscillator and to said first oscillator, said calibration means, operative after said stop mode is terminated, causing said first counter to count using said first oscillator, after said first oscillator is out of said stop mode, with said second counter also counting, from a predetermined initial count until said second counter expires, using said second oscillator, said calibration means determining an operating frequency of said second oscillator, based on the time it takes said second counter to expire measured by said first counter and said predetermined initial count, and setting said predetermined time period according to said operating frequency of said second oscillator.

4. A device according to claim 3, wherein said calibration means:

synchronizing said second counter with said first counter in a normal operating mode;

said first counter continuously counting said first oscillator until said second counter has expired;

reading said first counter to determine the time it took said second counter to expire;

calculating said true operating frequency of said second oscillator based on said time it took said second counter to expire and said predetermined count initially set in said second counter.

5. In a processor-based packet radio interfacing between a data processing unit and a wireless data transceiver, said packet radio comprising a first oscillator and a first timer for providing internal timing and a wakeup logic for invoking said packet radio from a stop mode, said stop mode causing said packet radio to remain non-operational after said packet radio has been inactive in a predetermined period to preserve power, a low-power device for periodically triggering said wakeup logic to invoke said packet radio from said stop mode, comprising:

a ring oscillator of a predetermined frequency for continuously generating an oscillating signal in said stop mode, said ring oscillator being integrated with said packet radio;

a second counter coupled to said ring oscillator for counting said ring oscillator to a predetermined count when said second counter expires corresponding to a predetermined period for said packet radio to awake from said stop mode;

detection means coupled to said second counter for detecting if said second counter has expired and if so, said detection means generating a wakeup signal to trigger said wakeup logic, such that stop mode is terminated after said predetermined period;

a calibration means coupled to said ring oscillator and to said first oscillator, said calibration means, operative after said stop mode is terminated, operating said first and second counters to determine an actual time it took said second counter to expire and setting said predetermined period for triggering said wakeup logic according to said actual time of said second oscillator, said calibration means:

synchronizing said second counter with said first counter after said stop mode is terminated;

said first counter continuously counting said first oscillator until said second counter has expired;

reading said first counter to determine the time it took said second counter to expire;

calculating an operating frequency of said second oscillator based on said time it took said second counter to expire and said predetermined count initially set in said second counter.

6. A method for a processing unit in an electronic system to self-awaken from a low-power stop mode after a predetermined time period, said electronic system comprising a second oscillator of a nominal frequency and a crystal oscillator of a predetermined frequency and a first counter for providing internal timing to said electronic system, said electronic system converting itself into said low-power stop mode from a normal operating mode after a predetermined period of inactivity, said low-power stop mode causing said electronic system to remain non-operational until said stop mode is terminated, comprising the steps of:

a) continuously operating said second oscillator to generate an oscillating signal in said low-power stop mode;

b) counting said oscillating signals by using a second counter coupled to said second oscillator to a predetermined count when said second counter expires in said predetermined time period;

c) detecting by using a detection means coupled to said second counter if said second counter has expired and if so, said detection means generating a wakeup signal to invoke said wakeup logic, such that said stop mode is terminated after said predetermined time period, further comprising the step of:

d) calibrating by using a calibration means coupled to said second oscillator and to said crystal oscillator, said calibration means, operative after said stop mode is terminated, causing said first counter to count using said crystal oscillator, after said crystal oscillator is out of said stop mode, with said second counter also counting, from a predetermined initial count until said second counter expires, using said second oscillator, said calibration means determining an operating frequency of said second oscillator, based on the time it takes said second counter to expire measured by said first counter and said predetermined initial count, and setting said predetermined time period according to said operating frequency of said second oscillator.

7. The method according to claim 6, said step of calibrating further comprises the steps of:

e) synchronizing said second counter with said first counter in a normal operating mode;

f) said first counter continuously counting said crystal oscillator until said second counter has expired;

g) reading said first counter to determine the time it took said second counter to expire;

h) calculating said true operating frequency of said second oscillator based on said time it took said second counter to expire and said predetermined count initially set in said second counter.

8. A method for a data/voice communication system to self-awaken from a low-power stop mode after a predetermined time period to receive an asynchronous paging signal from a basestation, said data/voice communication system comprising a second oscillator of a nominal frequency and a crystal oscillator of a predetermined frequency and a first counter for providing internal timing to said electronic system, said data/voice communication system converting itself into said low-power stop mode from a normal operating mode after a predetermined period of inactivity, said low-power stop mode causing said electronic system to remain dormant until said stop mode is terminated, comprising the steps of:

a) continuously operating said second oscillator to generate an oscillating signal in said low-power stop mode;

b) counting said oscillating signals by using a second counter coupled to said second oscillator to a predetermined count when said second counter expires in said predetermined time period;

c) detecting by using a detection means coupled to said second counter if said second counter has expired and if so, said detection means generating a wakeup signal to invoke said wakeup logic, such that said stop mode is terminated after said predetermined time period, further comprising the step of:

d) calibrating by using a calibration means coupled to said second oscillator and to said crystal oscillator, said calibration means, operative after said stop mode is terminated, causing said first counter to count using said crystal oscillator, after said crystal oscillator is out of said stop mode, with said second counter also counting, from a predetermined initial count until said second counter expires, using said second oscillator, said calibration means determining an operating frequency of said second oscillator, based on the time it takes said second counter to expire measured by said first counter and said predetermined initial count, and setting said predetermined time period according to said operating frequency of said second oscillator.

9. The method according to claim 8, said step of calibrating further comprises the steps of:

e) synchronizing said second counter with said first counter in a normal operating mode;

f) said first counter continuously counting said crystal oscillator until said second counter has expired;

g) reading said first counter to determine the time it took said second counter to expire;

h) calculating said true operating frequency of said second oscillator based on said time it took said second counter to expire and said predetermined count initially set in said second counter.

10. A device according to claim 1, wherein said second oscillator is a ring oscillator.

11. A device according to claim 3, wherein said second oscillator is a ring oscillator.

* * * * *